May 12, 1964 F. R. SHONKA 3,133,248
ELECTROMETER UTILIZING A.-C. AND D.-C. VOLTAGE BALANCING
Filed March 19, 1962 2 Sheets-Sheet 1

INVENTOR.
Francis R. Shonka
BY
Roland G. Anderson
Attorney

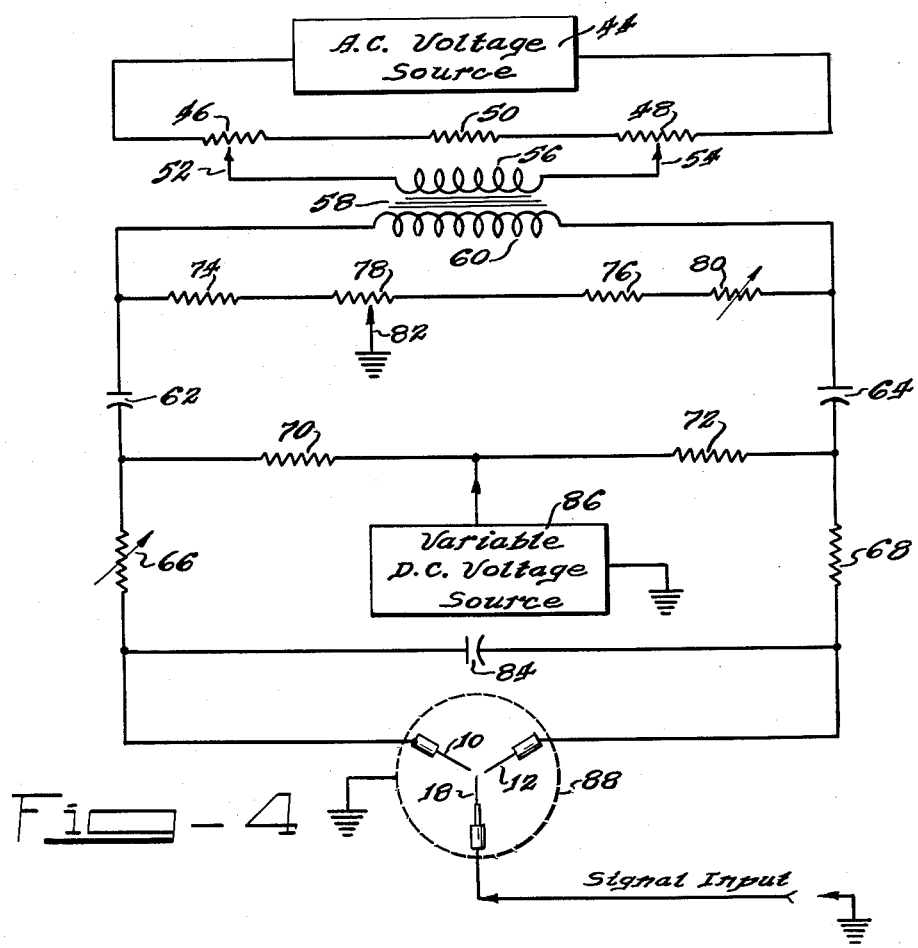
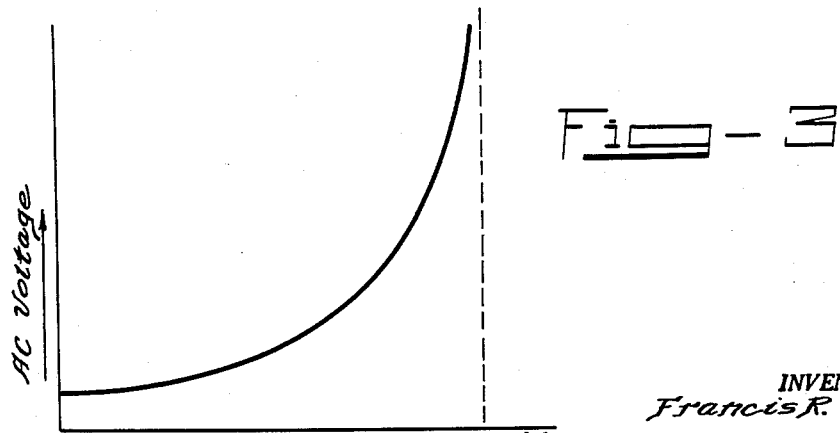

United States Patent Office 3,133,248
Patented May 12, 1964

3,133,248
ELECTROMETER UTILIZING A.-C. AND D.-C. VOLTAGE BALANCING
Francis R. Shonka, Riverside, Ill., assignor to the United States of America as represented by the United States Atomic Energy Commission
Filed Mar. 19, 1962, Ser. No. 180,909
12 Claims. (Cl. 324—109)

This invention relates to electrometers and more specifically to an A.-C. electrometer.

The conventional electrometer comprises a movable element, usually a fiber, located symmetrically between and insulated from two other electrodes known as deflecting electrodes. A D.-C. voltage source is used to impress approximately equal and opposite D.-C. voltages on the deflecting electrodes and, with the fiber electrically grounded, these voltages are balanced so that the electrical zero coincides with the mechanical zero of the instrument. The detected signal is applied to the fiber, a positive signal deflecting the fiber toward the negative electrode and, vice versa, a negative signal on the fiber deflecting it toward the positive electrode.

This type of instrument has several inherent disadvantages. The sensitivity of the instrument is low. Using a skilled operator and extreme care, a sensitivity of 2000 lines per volt may be obtained. To obtain this sensitivity, the fiber has to be very flexible thereby making the instrument delicate to handle, slow in response time, and subject to geotropic effects on the fiber. If an overvoltage signal is applied to the fiber, the instrument becomes paralyzed, that is, it is unable to give correct readings for sometime thereafter. Further, there is no way to individually compensate for, measure, or determine contact potential drift in the instrument, thereby effecting the accuracy of the readings. There is also no way of distinguishing between an applied D.-C. input signal and an "Off" balance condition. The balancing of a conventional D.-C. electrometer can be made only with zero signal on the fiber.

It is therefore one object of the present invention to provide an electrometer having a high sensitivity and fast response time.

It is another object of the present invention to provide a rugged electrometer having a sensitivity of 10,000 lines per volt.

It is another object of the present invention to provide an electrometer capable of individually compensating for, and determining the amount of, contact potential drift.

It is another object of the present invention to provide an electrometer which is relatively free from geotropic effects.

It is yet another object of the present invention to provide an electrometer which can withstand large input signal overvoltages without becoming paralyzed.

It is another object of the present invention to provide an electrometer which is simple to operate and which has a highly nonlinear movement.

It is still another object of the present invention to provide an electrometer which can be balanced in the presence of a D.-C. input signal.

Other objects of the present invention will become apparent as the detailed description proceeds.

In general, the present invention comprises an electrometer having two deflecting electrodes and a short movable fiber. An A.-C. potential is applied to the two deflecting electrodes and means are provided to adjust the balance of the A.-C. voltage so that the peak forces therefrom on the deflecting electrodes are equal at all times throughout the cycle of the applied voltage. Means are also provided for externally balancing any D.-C. contact potential effect existing in the instrument.

More complete understanding of the invention will best be obtained from consideration of the accompanying drawings in which:

FIG. 3 is a graphical representation of the sensitivity of the electrometer of FIG. 2.

FIG. 4 is a schematic of the preferred component circuitry for the electrometer of the present invention.

Figure 1:
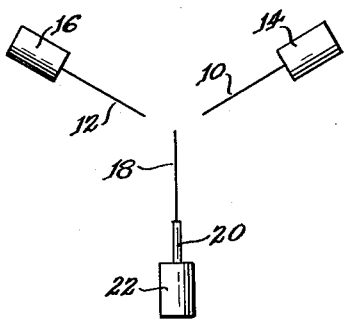
FIG. 1 is a sketch illustrating the spatial relationships of the elements of the electrometer for the present invention.

In FIG. 1, the deflecting electrodes 10 and 12 are mounted in holders 14 and 16 respectively. The movable fiber 18 is attached to a wire 20 which in turn is mounted in holder 22. The holders 14, 16, and 22 are mounted in the chamber (not shown) of the electrometer instrument so that the fiber 18 and electrodes 10 and 12 lie in a plane parallel to the paper as shown and are angularly displaced 120° from each other. The deflecting electrodes 10 and 12 are of conventional material and are approximately 0.020 inch thick. The fiber 18 is a quartz fiber approximately 3 mm. long and 4 microns thick, thereby being stiff and resistant to geotropism. The wire 20 to which the fiber 18 is attached is of a suitable conducting material and is approximately 0.020 inch thick.

Figure 2:
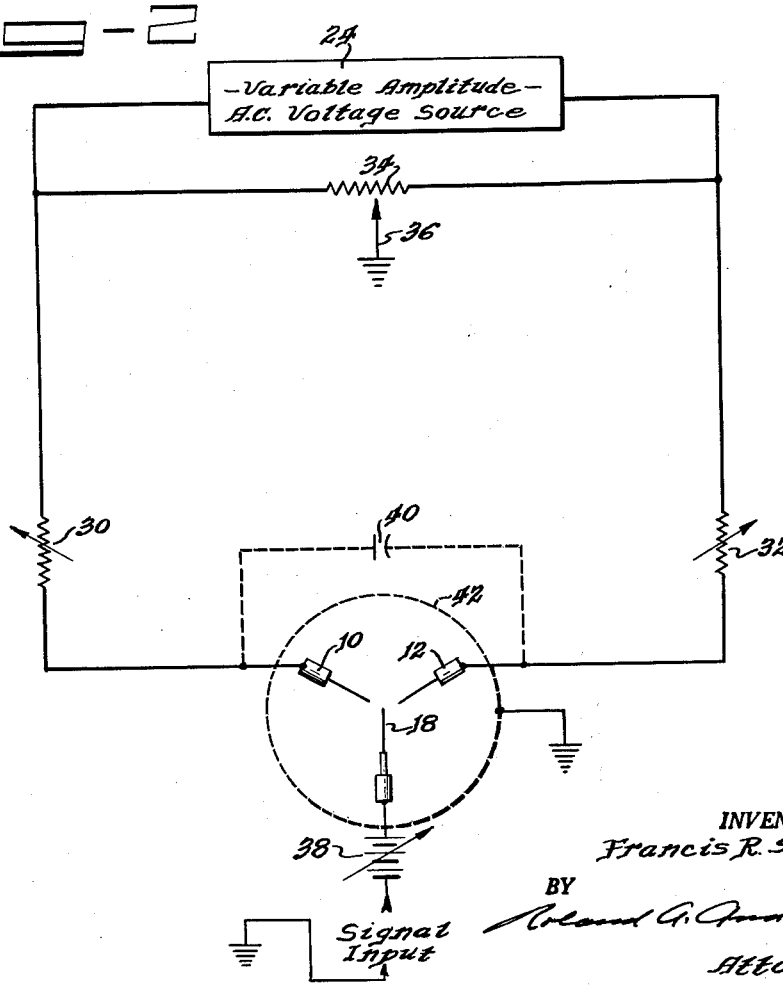
FIG. 2 is a schematic of the basic component circuitry for the electrometer of the present invention.

FIG. 2 illustrates a basic control circuit for operation of the elements shown in FIG. 1. The output of an A.-C. voltage source 24 is connected through variable resistors 30 and 32 to the deflecting electrodes 10 and 12. A potentiometer 34, with the wiper arm 36 thereof grounded, is connected across the output of the A.-C. source 24. The output of a variable voltage D.-C. source 38 is connected to the fiber 18. The D.-C. input signal to be detected by the electrometer is applied to the fiber 18. A capacitor 40 is connected across the deflecting electrodes 10 and 12, and the chamber 42 surrounding the fiber 18 and electrodes 10 and 12 is grounded.

In operation, the A.-C. voltage source 24 supplies a 60 cycle A.-C. voltage which alternately reverses the polarity on the deflecting electrodes 10 and 12 sixty times per second. If the electrometer is balanced for electrical zero, the reversing polarity on the electrodes 10 and 12 will not cause an unbalance and the fiber 18 will not oscillate. If there is an electrical unbalance, the fiber 18 will be attracted to the same electrode twice during each cycle. Thus, the fiber 18 will oscillate at double the frequency of the applied A.-C. voltage or 120 times per second.

To achieve A.-C. balance, the position of the wiper arm 36 is varied thereby dividing the balance of swing of the applied A.-C. voltage to the two electrodes 10 and 12. The position of the wiper arm 36 is adjusted until the fiber 18 remains at rest. At this point the amplitude of the electrostatic forces resulting from the A.-C. supply 24 will be balanced as to the deflecting electrodes 10 and 12. However, due to the inherent nature of the circuitry, the electrostatic forces will not be equal in amplitude at the same instant of time throughout the duration of the cycle. Therefore variable resistors 30 and 32 and capacitor 40 are inserted in the circuit to provide phase adjustment of the applied A.-C. signal. By varying the value of resistors 30 and 32, the phase of the applied A.-C. voltage is varied until the forces on the deflecting electrodes 10 and 12 therefrom are equal in time duration and the fiber 18 remains at rest. It should be noted that the capacitor 40 may be replaced by using leads to the electrodes 10 and 12 which have sufficient self capacitance (approximately $50\mu\mu f$).

The foregoing description has set forth the method and the apparatus necessary for A.-C. balance of the electrometer. With the circuit electrically balanced for A.-C. zero, any D.-C. voltage applied to the fiber 18 or an unbalance in D.-C. voltage applied to the deflecting electrodes 10 and 12 will cause the fiber to be attracted to the electrode of opposite polarity and the fiber 18 will oscillate at the same frequency as the applied A.-C. voltage. Therefore, for initial balanced conditions, all effects from stray D.-C. voltages should be nulled.

In the electrometer of FIG. 2, stray D.-C. voltages emanate from two principal sources. D.-C. voltages may be introduced into the circuit by the voltage supply 24 or be generated as D.-C. contact potentials which exist between any dissimilar metals. The D.-C. contact potentials are not constant but drift as time elapses. To eliminate the effect of the D.-C. contact potentials and any other stray D.-C. voltages, a variable amplitude D.-C. voltage from source 38 is impressed on the fiber 18. This impressed D.-C. voltage on fiber 18 is adjusted to balance the effect of the stray D.-C. voltages. Thus, with the A.-C. and D.-C. voltages electrically balanced, the fiber 18 remains completely at rest with no D.-C. signal input applied thereto. For any subsequent D.-C. signal input applied to the fiber 18, the fiber will commence to oscillate symmetrically about the mechanical zero position thereof at a frequency rate equal to the frequency of the applied A.-C. voltage. As previously recited, an unsymmetrical oscillation about the mechanical zero position will result if the electrometer is not properly A.-C. zeroed. It is to be particularly noted that an A.-C. zero adjustment can be made in the presence of an applied D.-C. input signal on the fiber 18. The movement of fiber 18 when a D.-C. input signal is applied thereto is highly nonlinear, a large deflection being observed for small voltages and, for a large increase in signal, the additional deflection of the fiber 18 being very small. It is also to be noted that with the application of a D.-C. signal of several hundred volts, the instrument does not become paralyzed, but will give accurate detection immediately thereafter. The sensitivity and response of the instrument of FIG. 1 is high. A sensitivity of 10,000 lines per volt has been obtained with no special skill required in the balancing therefor. To increase the sensitivity of the instrument, the amplitude of the applied A.-C. signal from source 24 is increased. FIG. 3 illustrates graphically the correlation between the sensitivity and the applied A.-C. voltage. As shown by the curve in FIG. 3, there is a finite practical limit to the sensitivity obtainable and this is approximately 10,000 lines per volt.

FIGURE 4 illustrates the preferred component circuitry for the electrometer of the present invention. The functioning of the electrometer of FIG. 4 is essentially the same as in the electrometer of FIG. 2 except for the balancing of stray D.-C. voltages. In the electrometer of FIG. 4, the circuit components provide a means whereby D.-C. contact potentials may be compensated for individually whereas in FIG. 2, they are compensated for together with any other stray D.-C. voltages existing in the instrument.

The A.-C. voltage source 44 is a 110 volt 60 cycle supply whose output is connected across potentiometers 46 and 48 and resistor 50. Potentiometers 46 and 48 have values of 1K and 100 ohms, respectively, and resistor 50 a value of 5K. The potentiometers 46 and 48 provide coarse and fine control respectively for varying the sensitivity of the instrument.

The wiper arms 52 and 54 of potentiometers 46 and 48 are connected to the primary winding 56 of a transformer 58. The output from the secondary winding 60 of transformer 58 is connected through 0.02 $\mu f.$ capacitors 62 and 64, 1 megohm variable resistor 66, and 500K resistor 68 to deflection electrodes 10 and 12. The 0.02 $\mu f.$ capacitors 62 and 64 together with 5 megohm bleeding resistors 70 and 72 form filters to block any D.-C. voltages and very low frequency voltages transmitted by transformer 58.

Two fixed 220K resistors 74 and 76, a 25K potentiometer 78, and a 2K variable resistor 80 provide the means for A.-C. zero balance for the electrometer. The wiper arm 82 of potentiometer 78 is grounded and provides coarse control, while variable resistor 80 provides fine control therefor. Variable resistor 66, fixed resistor 68, and capacitor 84 provide the phase shift control for the A.-C. zero balance. The value of the capacitor 84 together with the inherent capacitance of the leads therefrom to the deflecting electrodes 10 and 12 should be approximately 50–100 $\mu\mu f.$ to insure adequate phase shifting of the A.-C. signal.

Since capacitors 62 and 64 together with bleeding resistors 70 and 72 block any D.-C. voltages and low frequency voltages transmitted from A.-C. source 44, individual compensation for D.-C. contact potentials generated by dissimilar metals is achieved by applying a D.-C. voltage to the deflecting electrodes 10 and 12 from a variable D.-C. voltage source 86. The chamber 88 housing electrodes 10 and 12 and fiber 18 is electrically grounded.

With the electrometer zero balanced, the input signal is applied to the fiber 18, whereby it will be detected by oscillation of the fiber 18 at a frequency equal to that of the applied A.-C. voltage. It should be noted that since the D.-C. contact potentials are compensated for separately, the instrument may be readily adapted to the measurement of D.-C. contact potential drift.

The electrometers of FIGS. 2 and 4 readily lend themselves to automatic readout devices, which may eliminate the necessity of using optics. If the electrometer is operated in a steady magnetic field, the vibrations of the fiber 18 in this field will induce an A.-C. voltage in the fiber 18 of the same frequency as the frequency of vibration of the fiber. Using the variable D.-C. voltage supply to balance the applied D.-C. input signal on the fiber 18, detection of the frequency of the generated A.-C. voltage will give electrical readings of the applied D.-C. input signal and any A.-C. zero unbalance. Further, changes in polarity of the applied D.-C. input signal may be easily detected since the phase of oscillation of fiber 18 will shift 180° with a change in polarity.

Persons skilled in the art will, of course, readily adapt the teachings of the invention to embodiments far different than the embodiments illustrated. Accordingly, the scope of protection afforded the invention should not be limited to the particular embodiments thereof shown in the drawings and described above, but should be determined only in accordance with the appended claims.

What is claimed is:

1. An A.-C. electrometer comprising first and second deflecting electrodes, a movable fiber, means for applying an A.-C. voltage to said deflecting electrodes, means for applying a D.-C. voltage to said fiber, and means for varying said applied A.-C. and D.-C. voltages to cause said fiber to remain at rest with no input signal applied thereto.

2. The electrometer according to claim 1 wherein said movable fiber is a quartz fiber approximately 4 microns thick and 3 millimeters long and cantilever mounted.

3. An electrometer comprising first and second rigid deflecting electrodes, a movable fiber, means for applying an A.-C. voltage to said first and second deflecting electrodes, means for applying a D.-C. voltage to said first and second electrodes, and means for varying said applied A.-C. and D.-C. voltages to cause said fiber to remain at rest with no input signal applied thereto.

4. An electrometer comprising first and second rigid deflecting electrodes, a cantilever mounted movable fiber, an A.-C. voltage source, the output of said A.-C. voltage source being connected to said first and second electrodes, means for varying the amplitude-polarity swing of the output of said A.-C. voltage source with respect to said first and second electrodes, means for varying the phase of the output of said A.-C. voltage source with respect to said first and second electrodes and means for applying a D.-C. voltage to said fiber.

5. The electrometer according to claim 4 further including means for varying the amplitude of the output of said A.-C. source, whereby the sensitivity of the electrometer is varied.

6. The electrometer according to claim 5 wherein said amplitude-polarity swing varying means comprise a potentiometer connected across the output of said A.-C. voltage source, the wiper arm of said potentiometer being electrically grounded.

7. The electrometer according to claim 6 wherein said phase varying means comprise first and second variable resistors connected in the output of said A.-C. voltage source and a capacitor connected across said first and second electrodes.

8. An electrometer comprising first and second rigid deflecting electrodes, a cantilever mounted movable fiber, an A.-C. voltage source, the output of said A.-C. voltage source being connected to said first and second electrodes, means for varying the amplitude of the output of said A.-C. voltage source, means for varying the amplitude-polarity swing of the output of said A.-C. voltage source with respect to said first and second electrodes, filtering means for blocking any D.-C. and low frequency A.-C. voltages generated by said A.-C. voltage source, means for varying the phase of the output of said A.-C. voltage source with respect to said first and second electrodes, and means for applying a D.-C. voltage to said first and second electrodes.

9. The electrometer according to claim 8 wherein said amplitude varying means comprise first and second potentiometers, a fixed resistor, said potentiometers and resistor being connected in series across the output of said A.-C. voltage source, and a transformer having a primary and secondary, the primary of said transformer being connected across the wiper arms of said first and second potentiometers, the output of the secondary of said transformer being connected across said first and second electrodes.

10. The electrometer according to claim 9 wherein said amplitude-polarity swing varying means comprise first and second fixed resistors, a variable resistor, and a potentiometer, said potentiometer and resistors being connected in series across the secondary of said transformer, the wiper arm of said potentiometer being electrically grounded.

11. The electrometer according to claim 10 wherein said filtering means comprise first and second fixed bleeding resistors connected in series across the secondary of said transformer, and first and second capacitors connected in the output of the secondary of said transformer.

12. The electrometer according to claim 11 wherein said D.-C. voltage applying means comprise a variable amplitude D.-C. voltage source, the output of said D.-C. source being connected to the common junction of said first and second bleeding resistors.

No references cited.